United States Patent
Storgaard Pedersen (10) Patent No.: US 8,403,620 B2
(45) Date of Patent: Mar. 26, 2013

(54) METHOD FOR MOVING A WIND TURBINE COMPONENT, SUCH AS A WIND TURBINE HUB, FROM A TRANSPORTATION POSITION TO A WIND TURBINE ASSEMBLY POSITION IN OR ON THE NACELLE, THE MAIN SHAFT OR TURBINE HUB, A HANDLING UNIT, A WIND TURBINE HUB AND USE HEREOF

(75) Inventor: Gunnar Kamp Storgaard Pedersen, Skjern (DK)

(73) Assignee: Vestas Wind Systems A/S, Aarhus N (DK)

( * ) Notice: Subject to any disclaimer, the term of this patent is extended or adjusted under 35 U.S.C. 154(b) by 19 days.

(21) Appl. No.: 12/524,329

(22) PCT Filed: Jan. 24, 2008

(86) PCT No.: PCT/DK2008/000028
§ 371 (c)(1),
(2), (4) Date: Jul. 23, 2009

(87) PCT Pub. No.: WO2008/089763
PCT Pub. Date: Jul. 31, 2008

(65) Prior Publication Data
US 2009/0324380 A1 Dec. 31, 2009

(30) Foreign Application Priority Data
Jan. 24, 2007 (DK) .................. 2007 00106

(51) Int. Cl.
*B66C 1/10* (2006.01)
(52) U.S. Cl. ............... 414/809; 294/81.4; 294/67.5

(58) Field of Classification Search ............ 294/81.4, 294/67.5; 414/809
See application file for complete search history.

(56) References Cited

U.S. PATENT DOCUMENTS
(Continued)

FOREIGN PATENT DOCUMENTS
DE 20109835 1/2002
DE 20114909 3/2002
(Continued)

OTHER PUBLICATIONS
International Preliminary Report on Patentability dated Jul. 16, 2009.
(Continued)

*Primary Examiner* — Saul Rodriguez
*Assistant Examiner* — Jonathan Snelting
(74) *Attorney, Agent, or Firm* — Wood, Herron & Evans, LLP (57) ABSTRACT

The invention relates to a method for moving a wind turbine component, such as a wind turbine hub, from a transportation position to a wind turbine assembly position. The method comprises the steps of: attaching a handling unit to a structural part of the wind turbine component, operatively connecting the handling unit to a wire of a crane system, lifting the wind turbine component with the crane system to an assembly position of the wind turbine, the handling unit and the wind turbine component being suspended from a wire of the crane system, and rotating the wind turbine component with the handling unit during the lifting of the wind turbine component in order to orientate the wind turbine component for assembly. The invention also relates to a handling unit and a wind turbine hub and use hereof.

21 Claims, 7 Drawing Sheets

U.S. PATENT DOCUMENTS

| | | | |
|---|---|---|---|
| 4,154,470 A * | 5/1979 | Dalglish | 294/93 |
| 4,358,143 A * | 11/1982 | Cullen | 414/626 |
| 6,733,058 B1 * | 5/2004 | Nakajima | 294/86.41 |
| 6,888,264 B1 | 5/2005 | Willis et al. | |
| 2005/0019166 A1 * | 1/2005 | Bervang | 416/244 A |
| 2007/0290426 A1 * | 12/2007 | Trede et al. | 269/1 |
| 2008/0273986 A1 * | 11/2008 | Sakaue | 416/244 R |

FOREIGN PATENT DOCUMENTS

| | | |
|---|---|---|
| DE | 10225025 A1 | 12/2003 |
| EP | 1101934 | 5/2001 |
| EP | 1239150 | 9/2002 |
| EP | 1239150 A2 | 9/2002 |
| EP | 1507975 A1 | 2/2005 |
| EP | 1925583 A1 | 5/2008 |
| WO | WO 2005108786 A1 * | 11/2005 |
| WO | WO 2006053554 A2 * | 5/2006 |

OTHER PUBLICATIONS

Prosieben Television GMBH, Screen Capture Images includes "Kampf mit der Windmuhle," Galileo Spezial (German Television Program). Original Air Date Nov. 19, 2004.

* cited by examiner

METHOD FOR MOVING A WIND TURBINE COMPONENT, SUCH AS A WIND TURBINE HUB, FROM A TRANSPORTATION POSITION TO A WIND TURBINE ASSEMBLY POSITION IN OR ON THE NACELLE, THE MAIN SHAFT OR TURBINE HUB, A HANDLING UNIT, A WIND TURBINE HUB AND USE HEREOF

PRIORITY CLAIM

This is a U.S. national stage of application No. PCT/DK2008/000028, filed on Jan. 24, 2008. Priority is claimed on the following application(s): Country: Denmark, Application No.: PA200700106, Filed: Jan. 24, 2007, the content of which is incorporated here by reference.

FIELD OF INVENTION

The invention relates to a method for moving a wind turbine component, such as a wind turbine hub, from a transportation position to a wind turbine assembly position, a handling unit, a wind turbine hub and the use hereof.

DESCRIPTION OF THE RELATED ART

The erection of a modern wind turbine at a site usually involves complicated crane operation with a number of very tall cranes.

Especially, it is complicated to transport wind turbine components to the site and lift them into place at great height with cranes, e.g., assembling the wind turbine hub to the nacelle.

The very large and heavy steel hub needs to be transported in a vertical position with an assembly surface facing downward or alternatively to be reinforced and supported for a horizontal transportation position.

The hub is lifted off the transportation vehicle at the erection site by at least two very tall cranes in order to be moved from a vertical position to a horizontal position and lifted to the assembly position at the nacelle.

It may be difficult to get hold of numerous tall cranes at the same time, especially at the often rural and remote erection sites of modern wind turbines. Further, the crane use is also quite costly.

It is an object of the present invention to provide an advantageous method and apparatus for lifting a wind turbine component to a nacelle assembly position with fewer demands to the crane use.

THE INVENTION

The invention provides a method for moving a wind turbine component, such as a wind turbine hub, from a transportation position to a wind turbine assembly position, said method comprising the steps of:
attaching a handling unit to a structural part of the wind turbine component,
operatively connecting the handling unit to a wire of a crane system,
lifting the wind turbine component with the crane system to an assembly position of the wind turbine, the handling unit and the wind turbine component being suspended from said wire, and
rotating the wind turbine component with the handling unit during the lifting of the wind turbine component in order to orientate the wind turbine component for assembly.

By integrating the rotation step, it is possible to advantageously lift the wind turbine component to an assembly position with just one crane. The rotation is advantageously controlled by means of actuating means of the handling unit.

In one aspect of the invention, said wind turbine assembly position is a wind turbine assembly position in or on a nacelle a main shaft or a hub.

Most wind turbine components that need to be lifted and, possibly, rotated are placed within or in connection with the nacelle.

In one aspect of the invention, said handling unit is attached to at least two connection points of said structural part of the wind turbine component.

Using at least two separated connection points reduces the requirements to the strength of the construction compared to a situation with only one connection point.

In one aspect of the present invention, said handling unit is connected to an internal structural part of the wind turbine component through an opening in the wind turbine component. Hereby, it is possible to use an existing structural part of the wind turbine to perform the rotation of the wind turbine component, e.g., parts of the blade bearing in a wind turbine hub, instead of establishing a structural part only dedicated to the rotation of the component. Such additional external structures such as flanges on a wind turbine component may easily conflict with the normal functionality of the wind turbine component.

It should be noted that the term "blade bearing" also include the hub parts of a pitch bearing for a pitch controlled wind turbine.

In another aspect of the present invention, said handling unit actuates a rotating movement around a unit rotational centre and the crane system establishes linear movement.

In a further aspect of the present invention, said wind turbine component is lifted and rotated to an assembly position and subsequently assembled directly to a nacelle positioned on a wind turbine tower. Hereby, an advantageous embodiment of the invention is achieved.

In an even further aspect of the present invention, the rotation movement is a one-way controlled rotation of the wind turbine component. Hereby it is ensured that oscillations are not inflicted in the component during the lift by performing forward and reverse rotational movements.

In one aspect of the present invention, said actuating means rotates the wind turbine component during the lifting by a defined angle of 70 to 100 degrees and preferably between 80 and 90 degrees. Hereby it is ensured that the component arrives at the assembly position in the right angle and is instantly ready for assembly.

In another aspect of the present invention, at least the rotation movement of the handling unit is controlled by one or more remote control units, e.g., operated from the nacelle. Hereby it is ensured that the rotation movement may be performed from a safe distance by one or more operators.

In one aspect of the invention, the method comprises a step of transporting the wind turbine component to a wind turbine site on a transport vehicle before attaching the handling unit to the structural part of the wind turbine component, and the wind turbine component is lifted directly from the transport vehicle.

In another aspect of the invention, the method comprises the step of transporting the wind turbine component to a wind turbine site on a transport vehicle after attaching the handling unit to the structural part of the wind turbine component but before operatively connecting the handling unit to a wire of a crane system, and the wind turbine component is lifted directly from the transport vehicle.

Lifting the wind turbine component directly from a transport vehicle simplifies the operation compared to other methods, where the wind turbine component has to be removed from the transport vehicle before it can be attached to a crane system and lifted up.

In another aspect of the present invention, said component is a wind turbine hub, which is lifted and rotated with the crane system and handling unit from the transportation position having the assembly surface facing downward to an assembly position with the assembly surface facing the front of the nacelle.

The wind turbine hub has a structure and weight, which only allows it to be advantageously transported in a configuration different from the assembly position.

In one aspect of the invention, said component is a wind turbine hub, said structural part is the hub part of a blade bearing and said opening is a blade opening in the hub.

Mounting the handling unit onto the existing blade bearing is advantageous in that it eliminates the need of any special mounting arrangement on the wind turbine component, such as brackets.

The invention also relates to a handling unit for moving a wind turbine component, such as a wind turbine hub, from a transportation position to a wind turbine assembly position, said handling unit comprising
at least one connection point for operatively connection to the wire of a crane system,
attachment means, preferably comprising at least two attachment points, for attachment of the unit to a structural part of the wind turbine component, and
actuating means actuating the wind turbine component around a unit rotational centre in order to perform the rotation of the wind turbine component of the method as described above in order to orientate the wind turbine component for assembly.

In an aspect of the present invention, said actuating means includes at least one actuator, such as hydraulic and/or electric actuators, at least one lever arm and a control system. The handling unit is attached to the wind turbine component in such a way that an even weight distribution is achieved at the lifting of the wind turbine component, i.e. the component may be rotated by only applying a little force, e.g., to a lever arm.

In another aspect of the present invention, said at least one actuator includes one or more hydraulic and one or more electric actuators. With the use of different types of actuators, it is possible to use one type such as the hydraulic actuator for the main part of the rotation and the electric actuator for the final exact adjustment of the position of the wind turbine component before attachment.

In an aspect of the present invention, said at least one actuator is powered by hand or motor operated hydraulic pump means and/or an electric generator or electric accumulator means. Hereby, an advantageous embodiment of the invention is achieved.

In another aspect of the present invention, said control system includes one or more remote control units, e.g., operated from the nacelle.

In another aspect of the present invention, the handling unit operational freedom is restricted to a defined rotation angle of 70 to 100 degrees and preferably between 80 and 90 degrees.

In a further aspect of the present invention, at least one of said lever arms is actuated by the actuating means to perform a scissor type of movement around the unit rotational centre.

Further, the invention relates to a wind turbine hub comprising at least one structural part for attaching a handling unit as described above.

In an aspect of the present invention, said hub comprises at least one opening and at least one internal structural part accessible for said handling unit through the opening.

The present invention also discloses the use of a handling unit as described above for lifting, rotating and attaching a wind turbine component, such as a wind turbine hub, gearbox or ring generator, to the wind turbine nacelle positioned on a wind turbine tower. Some wind turbine components, such as the hub, have a structure and weight which only allows it to be advantageously transported in a configuration different from the assembly position.

FIGURES

The invention will be described in the following with reference to the figures, in which.

DETAILED DESCRIPTION

Figure 1:
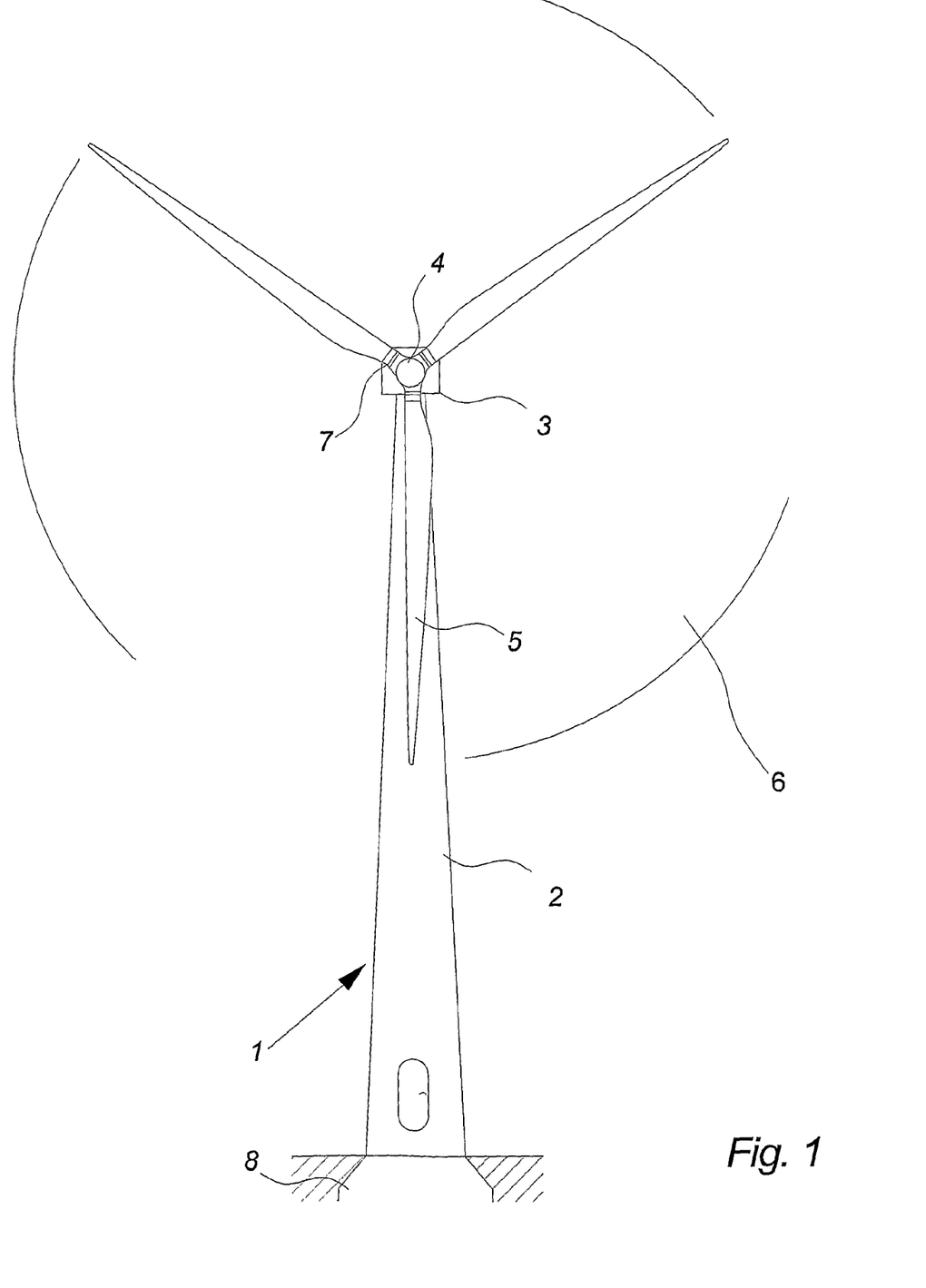
FIG. 1 illustrates a front view of a large modern wind turbine.

FIG. 1 illustrates a front view of a modern wind turbine 1 with a tower 2 positioned on a foundation 8. A wind turbine nacelle 3 and hub 4 is positioned on top of the tower.

The wind turbine rotor 6, comprising at least one wind turbine blade, such as three wind turbine blades 5 as illustrated, is connected to the wind turbine hub 4 through pitch mechanisms 7. Each pitch mechanism includes a blade bearing and pitch actuating means, which allows the blade to pitch.

Figure 2:
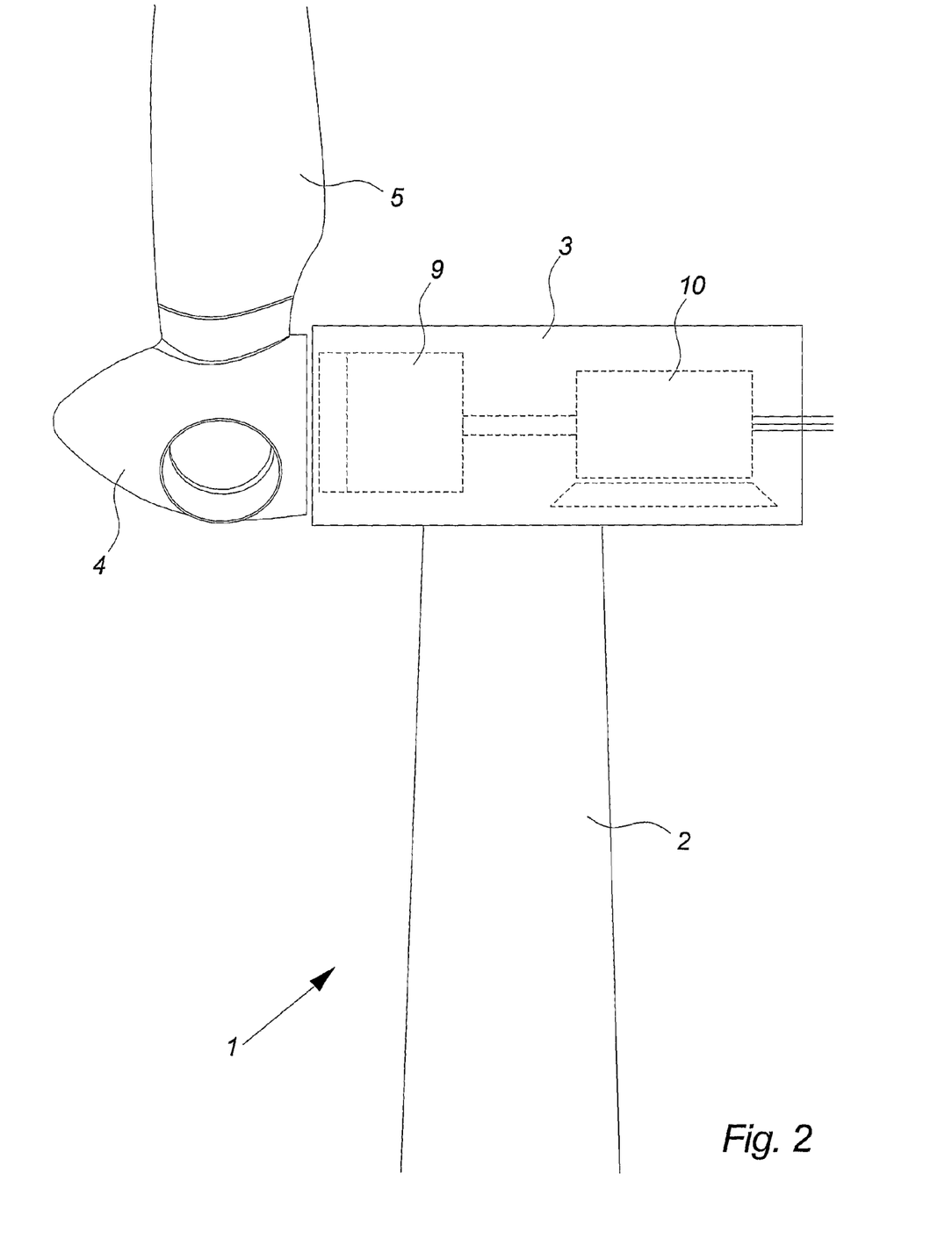
FIG. 2 illustrates schematically the wind turbine as seen from the side and with different wind turbine components.

FIG. 2 illustrates schematically the wind turbine seen from the side with different wind turbine components. Wind turbine components connected directly to the nacelle 3 include the wind turbine hub 4, the gearbox 9 and the generator 10 illustrated with an electric connection to a utility grid.

Figure 3:
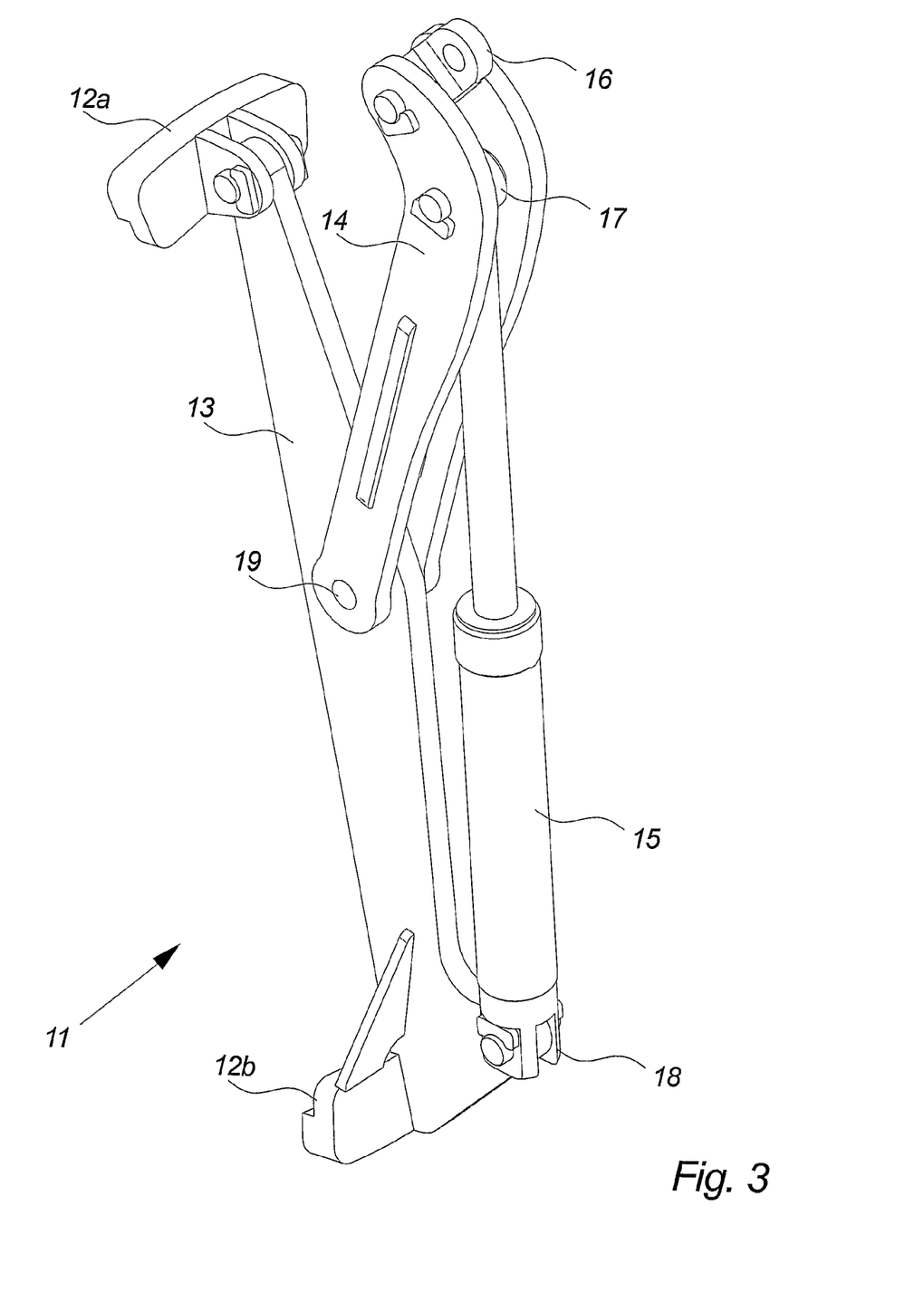
FIG. 3 illustrates a preferred embodiment of a handling unit according to the invention.

FIG. 3 illustrates a preferred embodiment of a handling unit 11 according to the invention.

The handling unit 11 includes first and second attachment points 12a, 12b for attachment to a structural part 22 of a wind turbine component. The attachment points 12a, 12b may be flanges with a number of holes allowing the unit to be bolted to the component in a fixed and rigid connection.

The first and second attachment points 12a, 12b are established on a fixed arm 13 of the handling unit 11. The fixed arm 13 also comprises a connection to a lever arm 14 connected to the fixed arm 13 in a rotational centre 19 of the handling unit 11.

An actuator 15 is connected to the fixed arm 13 and the lever arm 14 in connection points 17 and 18, i.e. connection point 17 for the actuator 15 to the lever arm 14 and connection point 18 for the actuator 15 to the fixed arm 13. The actuator 15 is preferably a hydraulic cylinder.

The actuator 15 and the arms 13, 14 allow the lever arm 14 to perform a controlled rotational movement around the rotational centre 19 of the unit. The lever arm 14 ends in a connection point 16, such as an eyelet, for a crane system. The crane system allows the handling unit 11 and the wind turbine component to be moved in linear directions, e.g., in a vertical and horizontal direction.

The handling unit 11 is preferably made in steel or a similar metal material with a high strength.

Figure 4A:
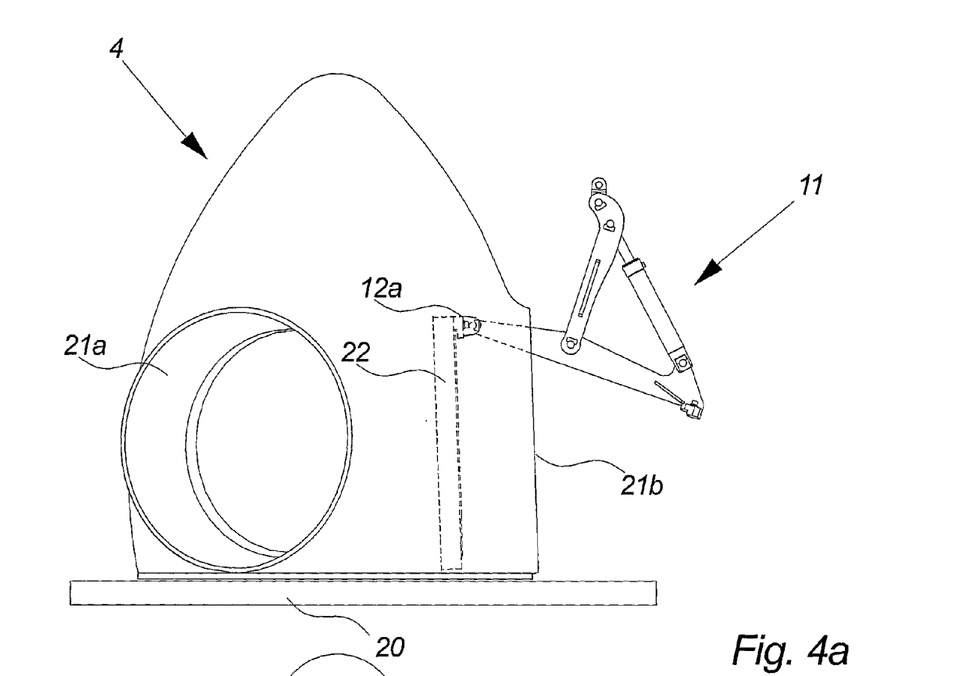
FIGS. 4a and 4b illustrate method steps of attaching the handling unit to a wind turbine component according to the invention.
Figure 4B:
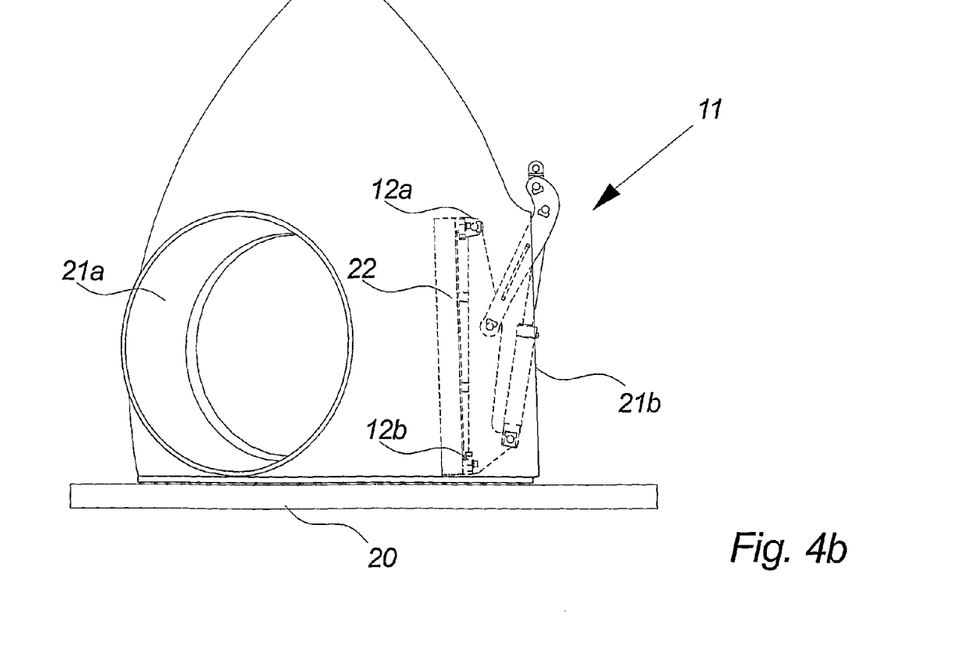

FIGS. 4a and 4b illustrate method steps of attaching the handling unit 11 to a wind turbine component according to the invention. The wind turbine component is illustrated as a wind turbine hub 4. The hub 4 is positioned on a section of a vehicle carrier surface 20, such as the platform of a truck. The transportation configuration includes the hub 4 standing in an upright, vertical, position with the assembly surface facing the carrier surface 20.

FIG. 4a illustrates the handling unit 11 attached to an internal structural part 22 of the hub 4 in a first attachment point 12a. The handling unit attachment to the internal structural part 22 is established through an opening 21b in the hub 4. The structural part 22 may be the hub part of a blade bearing, and the opening may be one of the blade openings in the hub 4.

The handling unit 11 may be suspended in a crane wire 24 during the attachment procedure (not illustrated in FIGS. 4a and 4b).

FIG. 4b illustrates the connection of the handling unit 11 in a second attachment point 12b to the structural part 22 by releasing the actuator 15.

Figure 5A:
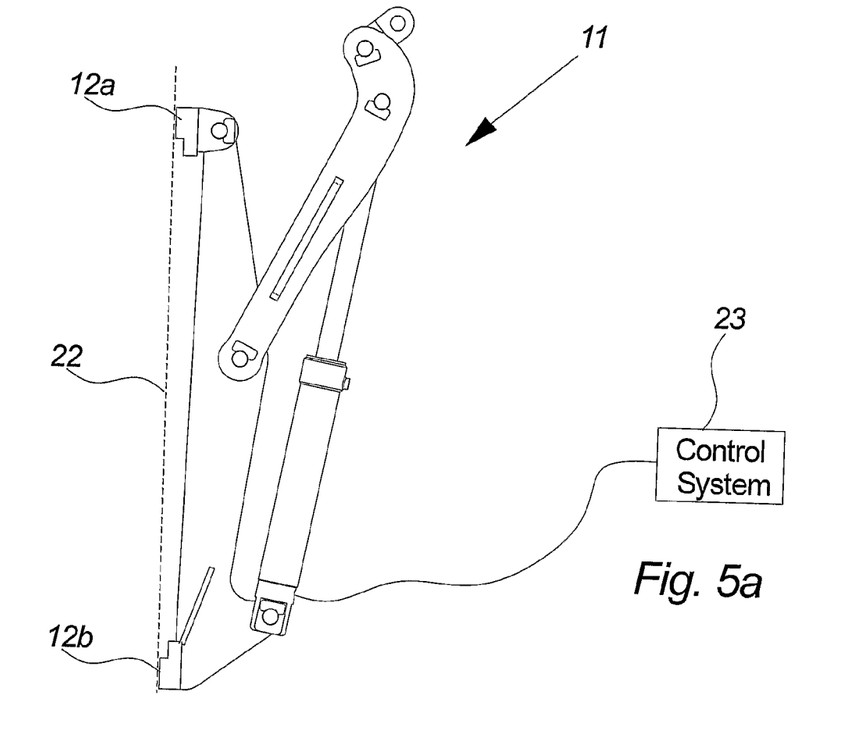
FIGS. 5a and 5b illustrate schematically the preferred embodiment of the handling unit according to the invention after attachment to a wind turbine component.
Figure 5B:
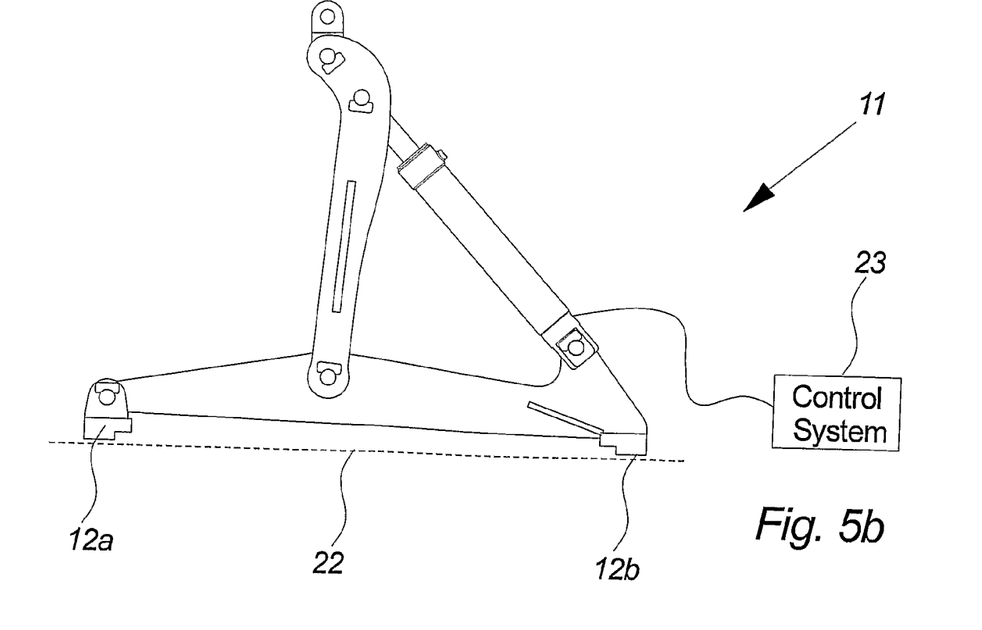

FIGS. 5a and 5b illustrate schematically the preferred embodiment of the handling unit 11 according to the invention after attachment to a wind turbine component. The figures further illustrate a control system 23 controlling the rotational movement of the wind turbine component.

FIG. 5a illustrates an initial position of the lifting and rotation of the wind turbine component. The control system may start the rotational movement after the component is lifted vertically and the necessary distance from a carrier surface 20 is established.

In a preferred embodiment of the invention, the actuator 15 is a hydraulic cylinder connected to a one-way valve and an expansion reservoir of the control system. The opening of the valve allows the hydraulic oil of the actuator 15 to be forced into the expansion reservoir in a controlled manner by the weight of the wind turbine component. This results in a slow piston rod movement into the cylinder 15 and a rotational movement of the wind turbine component until an end stop is reached. The end stop allows the rotational movement to be controlled within a range that ensures that the cylinder 15 is not emptied completely of hydraulic oil. The end stop also ensures that the wind turbine component is rotated a defined angle of, e.g., 70 to 100 degrees and preferably between 80 and 90 degrees before reaching an assembly position.

FIG. 5b illustrates the wind turbine component in a final, horizontal, position before assembly and with the hydraulic cylinder 15 with an almost retracted piston rod.

In another embodiment, the control system may comprise a two-way valve allowing the hydraulic oil to also be forced into the cylinder 15, e.g., with external power such as a hand operated pump.

FIGS. 6a to 6d illustrate the different method steps of attaching the handling unit 11 to the wind turbine component, the latter being illustrated as a wind turbine hub 4. Further, the steps of lifting and rotating the hub to an assembly position at the nacelle are illustrated in the figures.

Figure 6A:
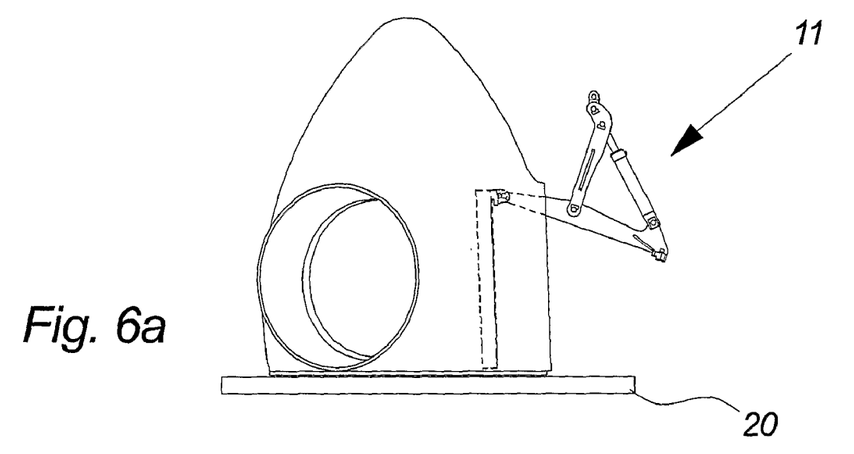
FIGS. 6a to 6d illustrate the different method steps of attaching the handling unit to the wind turbine component and, especially, lifting and rotating the component to an assembly position.
Figure 6B:
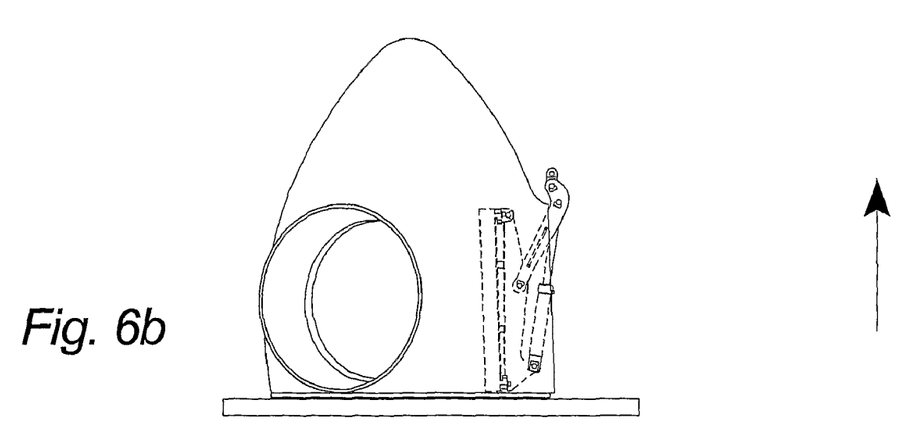

FIGS. 6a and 6b illustrate the mounting of the handling unit 11 on the hub 4 as explained in detail in the description of FIGS. 4a and 4b. FIG. 6b further illustrates the initial lifting force applied to the wind turbine component (symbolized with the straight line arrow).

Figure 6C:
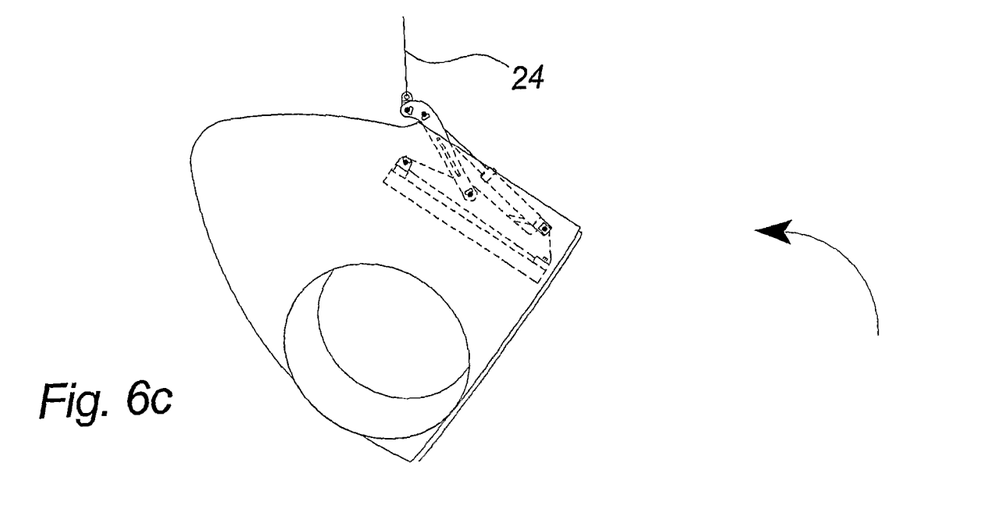

FIG. 6c illustrates the rotation of the wind turbine component performing the rotational movement by operating the control system (symbolized with the bend arrow).

Figure 6D:
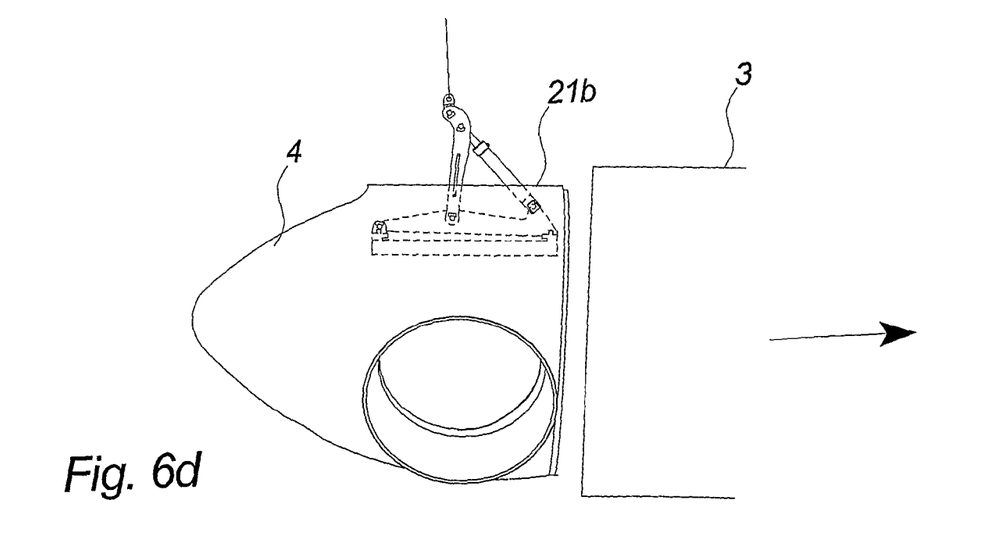

FIG. 6d illustrates the final position where the hub is ready for assembly to the front of the nacelle.

The invention described has been exemplified above with reference to specific examples of the handling unit. However, it should be understood that the invention is not limited to the particular examples but may be designed and altered in a multitude of varieties within the scope of the invention as specified in the claims, e.g., by use of electric driven actuators instead of hydraulic actuators. Even further, the invention may also be used to other wind turbine components, which may need rotation from a transportation position to a wind turbine assembly position at the nacelle, such as the wind turbine generator, e.g., a ring generator or gearbox, e.g., in connection with component replacement.

REFERENCE LIST

In the drawings the following reference numbers refer to:
1. Wind turbine
2. Wind turbine tower
3. Wind turbine nacelle
4. Wind turbine hub
5. Wind turbine blade
6. Wind turbine rotor with at least one blade
7. Blade pitch mechanism
8. Wind turbine foundation
9. Wind turbine gearbox
10. Wind turbine generator
11. Handling unit
12a, 12b. First and second attachment points for the handling unit
13. Fixed arm connected to the attachment points
14. Lever arm connected to the fixed arm
15. Actuator, such as a hydraulic actuator
16. Connection point for a crane system
17. Connection point for the actuator to the lever arm
18. Connection point for the actuator to the fixed arm
19. Rotational centre of the handling unit
20. Carrier surface of a transport vehicle
21a, 21b. Hub openings for wind turbine blades
22. Structural part, e.g., an internal hub structure, such as a part of the blade bearing
23. Control system for the actuating means, e.g., including a one- or two-way valve and an expansion reservoir
24. Wire of a crane system

The invention claimed is:

1. A method for moving a wind turbine component from a transportation position to a wind turbine assembly position using at least in part a crane system and a handling unit including an actuator, the wind turbine component having an external surface with an opening and an existing internal structural part contained inside the external surface, the method comprising:

attaching the handling unit to the internal structural part of the wind turbine component so that the handling unit extends through the opening in the wind turbine component, the handling unit being separable from the crane system, operatively connecting the handling unit to a wire of the crane system, subsequently lifting the handling unit and thereby the wind turbine component with the crane system, the handling unit and the wind turbine component being suspended from the wire, and rotating the wind turbine component by operating the actuator of the handling unit while the wind turbine component is suspended.

2. The method according to claim 1, wherein the wind turbine assembly position is a wind turbine assembly position in or on a nacelle, a main shaft or a hub.

3. The method according to claim 1, wherein the handling unit is attached to at least two connection points of the structural part of the wind turbine component.

4. The method according to claim 1, wherein the handling unit actuates a rotating movement around a unit rotational centre and the crane system establishes linear movement.

5. The method according to claim 1, wherein the wind turbine component is lifted and rotated to an assembly position and subsequently assembled directly to a nacelle positioned on a wind turbine tower.

6. The method according to claim 1, wherein the rotating of the wind turbine component is a one-way rotation of the wind turbine component controlled by the actuator.

7. The method according to claim 1, wherein the wind turbine component is rotated by a defined angle of 70 to 100 degrees.

8. The method according to claim 1, wherein at least the rotation movement of the handling unit is controlled by one or more remote control units.

9. The method according to claim 1, further comprising:
transporting the wind turbine component to a wind turbine site on a transport vehicle before attaching the handling unit to the structural part of the wind turbine component, where the wind turbine component is lifted directly from the transport vehicle.

10. The method according to claim 1, further comprising:
transporting the wind turbine component to a wind turbine site on a transport vehicle after attaching the handling unit to the structural part of the wind turbine component but before operatively connecting the handling unit to a wire of a crane system, where the wind turbine component is lifted directly from the transport vehicle.

11. The method according to claim 1, wherein the component is a wind turbine hub, which is lifted and rotated with the crane system and the handling unit from the transportation position having an assembly surface facing downward to the wind turbine assembly position with the assembly surface facing a front of a nacelle.

12. The method according to claim 1, wherein the component is a wind turbine hub, the internal structural part is a hub part of a blade bearing and the opening is a blade opening in the hub.

13. The method according to claim 1, wherein the handling unit is operatively connected to a single wire of the crane system, and the handling unit and the wind turbine component are suspended by only the single wire of the crane system during lifting of the handling unit and the wind turbine component.

14. The method according to claim 1, wherein the wind turbine component is rotated by the actuator of the handling unit simultaneous to the lifting of the handling unit and the wind turbine component by the crane system.

15. The method of claim 1, wherein the handling unit includes a fixed arm for rigid attachment to the structural part of the wind turbine component, a lever arm pivotally coupled to the fixed arm and for connection to the wire of the crane system, and the actuator which includes a hydraulic linear actuator coupled to the fixed arm and the lever arm, and rotating the wind turbine component further comprises:
activating the hydraulic linear actuator to increase or decrease in length between the lever arm and the fixed arm such that the fixed arm and the wind turbine component rotate with respect to the lever arm and the wire of the crane system.

16. The method of claim 15, wherein the lever arm includes a first end and a second end, and the lever arm is directly coupled to the crane system, the fixed arm, and the actuator by a connection consisting of three connection points: a pivotal connection point at the first end to the fixed arm, a pivotal connection point at the second end to the actuator, and a connection point at the second end to the crane system.

17. The method of claim 15, wherein the fixed arm of the handling unit includes first and second attachment points, and attaching the handling unit to the structural part of the wind turbine component further comprises:
rigidly and fixedly attaching the first attachment point of the fixed arm to the structural part with a fastener; and
rigidly and fixedly attaching the second attachment point of the fixed arm to the structural part with a fastener.

18. The method of claim 17, wherein rigidly and fixedly attaching the first and second attachment points of the fixed arm to the structural part further includes bolting the fixed arm to the structural part with bolt fasteners at the respective first and second attachment points.

19. The method of claim 17,
wherein the lever arm includes a first end and a second end, and the lever arm is directly coupled to the crane system, the fixed arm, and the actuator by a connection consisting of three connection points: a pivotal connection point at the first end to the fixed arm, a pivotal connection point at the second end to the actuator, and a connection point at the second end to the crane system, and
wherein the fixed arm includes first and second opposed ends and a central portion located between the first and second ends, the first end including the first attachment point, the second end including the second attachment point and a connection to the actuator, and the central portion defining a rotational center of the handling unit at the connection point with the first end of the lever arm.

20. A method for moving a wind turbine component from a transportation position to a wind turbine assembly position using at least in part a crane system and a handling unit including an actuator, the method comprising:
attaching the handling unit to a structural part of the wind turbine component, the handling unit being separable from the crane system and including a fixed arm with first and second attachment points for rigid and fixed attachment to the structural part of the wind turbine component, a lever arm pivotally coupled to the fixed arm and for connection to the wire of the crane system, and the actuator which includes a hydraulic linear actuator coupled to the fixed arm and the lever arm, operatively connecting the handling unit to a wire of the crane system, subsequently lifting the handling unit and thereby the wind turbine component with the crane system, the handling unit and the wind turbine component being suspended from the wire, and
rotating the wind turbine component by activating the hydraulic linear actuator to increase or decrease in length between the lever arm and the fixed arm such that the fixed arm and the wind turbine component rotate with respect to the lever arm and the wire of the crane system while the wind turbine component is suspended, wherein the lever arm includes a first end and a second end, and the lever arm is directly coupled to the crane system, the fixed arm, and the actuator by a connection consisting of three connection points: a pivotal connection point at the first end to the fixed arm, a pivotal connection point at the second end to the actuator, and a connection point at the second end to the crane system, and wherein the fixed arm includes first and second opposed ends and a central portion located between the first and second ends, the first end including the first attachment point, the second end including the second attachment point and a connection to the actuator, and the central portion defining a rotational center of the handling unit at the connection point with the first end of the lever arm.

21. A method for moving a wind turbine component from a transportation position to a wind turbine assembly position using at least in part a crane system and a handling unit, the method comprising:

attaching the handling unit to a structural part of the wind turbine component, the handling unit being separable from the crane system, the handling unit including a lever arm, an actuator, and a fixed arm with first and second attachment points for rigid and fixed attachment to the structural part of the wind turbine component, operatively connecting the handling unit to a wire of the crane system, subsequently lifting the handling unit and thereby the wind turbine component with the crane system, the handling unit and the wind turbine component being suspended from the wire, and rotating the wind turbine component operating the actuator of the handling unit while the wind turbine component is suspended, wherein the fixed arm includes first and second opposed ends and a central portion located between the first and second ends, the first end including the first attachment point, the second end including the second attachment point and a connection to the actuator, and the central portion including a connection to the lever arm to define a rotational center of the handling unit.

* * * * *